(12) United States Patent
Grawrock

(10) Patent No.: US 7,809,957 B2
(45) Date of Patent: *Oct. 5, 2010

(54) TRUSTED PLATFORM MODULE FOR GENERATING SEALED DATA

(75) Inventor: David Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1376 days.

This patent is subject to a terminal disclaimer.

(21) Appl. No.: 11/238,440

(22) Filed: Sep. 29, 2005

(65) Prior Publication Data

US 2007/0073416 A1 Mar. 29, 2007

(51) Int. Cl.
*G06F 12/14* (2006.01)

(52) U.S. Cl. .................. 713/193; 713/165; 713/166

(58) Field of Classification Search ............ 726/26, 726/27; 380/43, 277; 713/201, 187; 705/51; 725/31

See application file for complete search history.

(56) References Cited

U.S. PATENT DOCUMENTS

| | | | |
|---|---|---|---|
| 3,699,532 | A | 10/1972 | Schaffer et al. |
| 3,996,449 | A | 12/1976 | Attanasio et al. |
| 4,037,214 | A | 7/1977 | Birney et al. |
| 4,162,536 | A | 7/1979 | Morley |
| 4,207,609 | A | 6/1980 | Luiz et al. |
| 4,276,594 | A | 6/1981 | Morley |
| 4,278,837 | A | 7/1981 | Best |
| 4,307,447 | A | 12/1981 | Provanzano et al. |
| 4,319,233 | A | 3/1982 | Matsuoka et al. |
| 4,319,323 | A | 3/1982 | Ermolovich et al. |
| 4,366,537 | A | 12/1982 | Heller et al. |
| 4,403,283 | A | 9/1983 | Myntti et al. |
| 4,419,724 | A | 12/1983 | Branigin et al. |
| 4,430,709 | A | 2/1984 | Schleupen et al. |
| 4,521,852 | A | 6/1985 | Guttag |
| 4,529,870 | A | 7/1985 | Chaum |
| 4,571,672 | A | 2/1986 | Hatada et al. |
| 4,621,318 | A | 11/1986 | Maeda |
| 4,759,064 | A | 7/1988 | Chaum |

(Continued)

FOREIGN PATENT DOCUMENTS

DE 4217444 A1 12/1992

(Continued)

OTHER PUBLICATIONS

Trusted Computing Group (TCG). TPM v1.2 Specification Changes. Oct. 2003.*

(Continued)

*Primary Examiner*—Pramila Parthasarathy
(74) *Attorney, Agent, or Firm*—Blakely, Sokoloff, Taylor & Zafman LLP

(57) ABSTRACT

Embodiments of a method and system for creating sealed data are disclosed herein. A trusted platform module (TPM) is used to seal data and other information in a sealed blob. In one embodiment, a monotonic counter parameter is included in the sealed blob. In another embodiment, a tick counter parameter is included in the sealed blob. In yet another embodiment, a session parameter is included in the sealed blob. In each instance, the data is only released if the associated parameter included in the blob corresponds to a current parameter. Other embodiments are described and claimed.

26 Claims, 10 Drawing Sheets

U.S. PATENT DOCUMENTS

| | | | |
|---|---|---|---|
| 4,795,893 A | 1/1989 | Ugon | |
| 4,802,084 A | 1/1989 | Ikegaya et al. | |
| 4,843,541 A | 6/1989 | Bean et al. | |
| 4,974,159 A | 11/1990 | Hargrove et al. | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,628,023 A | 5/1997 | Bryant et al. | |
| 5,633,929 A | 5/1997 | Kaliski, Jr. | |
| 5,657,445 A | 8/1997 | Pearce | |
| 5,668,971 A | 9/1997 | Neufeld | |
| 5,680,547 A | 10/1997 | Chang et al. | |
| 5,684,948 A | 11/1997 | Johnson et al. | |
| 5,706,469 A | 1/1998 | Kobayashi | |
| 5,717,903 A | 2/1998 | Bonola | |
| 5,727,061 A | 3/1998 | Johnson et al. | |
| 5,729,760 A | 3/1998 | Poisner | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,790,668 A | 8/1998 | Tomko | |
| 5,796,845 A | 8/1998 | Serikawa et al. | |
| 5,805,712 A | 9/1998 | Davis | |
| 5,809,546 A | 9/1998 | Greenstein et al. | |
| 5,815,665 A | 9/1998 | Teper et al. | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,872,994 A | 2/1999 | Akiyama et al. | |
| 5,890,189 A | 3/1999 | Nozue et al. | |
| 5,901,225 A | 5/1999 | Ireton et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Insley | |
| 6,138,239 A | 10/2000 | Veil | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | |
| 6,252,650 B1 | 6/2001 | Nakamura | |
| 6,269,392 B1 | 7/2001 | Cotichini et al. | |
| 6,272,533 B1 | 8/2001 | Browne | |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,351,813 B1 | 2/2002 | Mooney et al. | |
| 6,357,004 B1 | 3/2002 | Davis | |
| 6,363,485 B1 | 3/2002 | Adams | |
| 6,374,286 B1 | 4/2002 | Gee et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,393,565 B1 | 5/2002 | Lockhart et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,445,797 B1 | 9/2002 | McGough et al. | |
| 6,463,535 B1 | 10/2002 | Drews et al. | |
| 6,463,537 B1 | 10/2002 | Tello | |
| 6,473,508 B1 | 10/2002 | Young et al. | |
| 6,473,800 B1 | 10/2002 | Jerger et al. | |
| 6,496,847 B1 | 12/2002 | Bugnion et al. | |
| 6,499,123 B1 | 12/2002 | McFarland et al. | |
| 6,505,279 B1 | 1/2003 | Philips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |

| | | | |
|---|---|---|---|
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,741,991 B2 | 5/2004 | Saito | |
| 6,898,576 B2* | 5/2005 | Stefik et al. | 705/50 |
| 6,988,250 B1 | 1/2006 | Proudler et al. | |
| 7,028,149 B2 | 4/2006 | Grawrock et al. | |
| 7,133,990 B2 | 11/2006 | Link et al. | |
| 7,165,181 B2 | 1/2007 | Brickell et al. | |
| 7,207,060 B2* | 4/2007 | Immonen et al. | 726/10 |
| 7,318,235 B2* | 1/2008 | Grawrock | 726/26 |
| 7,640,593 B2* | 12/2009 | Tarkkala | 726/26 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0004900 A1 | 1/2002 | Patel | |
| 2002/0007456 A1 | 1/2002 | Peinado et al. | |
| 2002/0023032 A1 | 2/2002 | Pearson et al. | |
| 2002/0104019 A1* | 8/2002 | Chatani et al. | 713/201 |
| 2002/0129261 A1 | 9/2002 | Cromer et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0002668 A1 | 1/2003 | Graunke et al. | |
| 2003/0005317 A1 | 1/2003 | Audebert et al. | |
| 2003/0018892 A1 | 1/2003 | Tello | |
| 2003/0074548 A1 | 4/2003 | Cromer et al. | |
| 2003/0112008 A1 | 6/2003 | Hennig et al. | |
| 2003/0115453 A1 | 6/2003 | Grawrock | |
| 2003/0115468 A1 | 6/2003 | Aull et al. | |
| 2003/0126442 A1 | 7/2003 | Glew et al. | |
| 2003/0126453 A1 | 7/2003 | Glew et al. | |
| 2003/0133575 A1 | 7/2003 | Challener | |
| 2003/0159056 A1 | 8/2003 | Cromer et al. | |
| 2003/0188156 A1 | 10/2003 | Yasala et al. | |
| 2003/0188179 A1 | 10/2003 | Challener et al. | |
| 2003/0196085 A1 | 10/2003 | Lampson et al. | |
| 2003/0231328 A1 | 12/2003 | Chapin et al. | |
| 2003/0235175 A1 | 12/2003 | Naghian et al. | |
| 2005/0141717 A1* | 6/2005 | Cromer et al. | 380/277 |

FOREIGN PATENT DOCUMENTS

| | | |
|---|---|---|
| EP | 0473913 A2 | 3/1992 |
| EP | 0600112 A1 | 6/1994 |
| EP | 0602867 A1 | 6/1994 |
| EP | 0892521 A2 | 1/1999 |
| EP | 0930567 A3 | 7/1999 |
| EP | 0961193 A2 | 12/1999 |
| EP | 0965902 A2 | 12/1999 |
| EP | 1030237 A1 | 8/2000 |
| EP | 1055989 A1 | 11/2000 |
| EP | 1056014 A1 | 11/2000 |
| EP | 1085396 A1 | 3/2001 |
| EP | 1146715 A1 | 10/2001 |
| EP | 1209563 A2 | 5/2002 |
| EP | 1271277 A2 | 1/2003 |
| FR | 2620248 A1 | 3/1989 |
| FR | 2700430 A1 | 12/1992 |
| FR | 2714780 A1 | 12/1993 |
| FR | 2742618 A1 | 11/1996 |
| FR | 2752122 A1 | 2/1998 |
| FR | 2763452 A1 | 11/1998 |
| FR | 2830147 A1 | 3/2003 |
| JP | 02000076139 A | 3/2000 |
| WO | WO 9524696 A2 | 9/1995 |
| WO | WO 9729567 A1 | 8/1997 |
| WO | WO 9812620 A1 | 3/1998 |
| WO | WO 9834365 A1 | 8/1998 |
| WO | WO 9844402 A1 | 10/1998 |
| WO | WO 9905600 A2 | 2/1999 |
| WO | WO 9909482 A1 | 2/1999 |
| WO | WO 9918511 A1 | 4/1999 |
| WO | WO 9957863 A1 | 11/1999 |
| WO | WO 9965579 A1 | 12/1999 |
| WO | WO 0021238 A1 | 4/2000 |
| WO | WO 0062232 A1 | 10/2000 |
| WO | WO 0127723 A1 | 4/2001 |
| WO | WO 0127821 A2 | 4/2001 |
| WO | WO 0163994 A2 | 8/2001 |
| WO | WO 0175564 A2 | 10/2001 |
| WO | WO 0175565 A2 | 10/2001 |
| WO | WO 0175595 A2 | 10/2001 |
| WO | WO 0201794 A2 | 1/2002 |
| WO | WO 0217555 A2 | 2/2002 |
| WO | WO 02060121 A1 | 8/2002 |
| WO | WO 02086684 A2 | 10/2002 |
| WO | WO 03058412 A2 | 7/2003 |

OTHER PUBLICATIONS

Intel, "Intel Protected Access Architecture, Application Interface Specification Revision 0.9.5", Aug. 2000, pp. 41 total.
Schneier, Bruce, Applied Cryptography, Second Edition, 1996, John Wiley & Sons, pp. 34-43.
Trusted Computing Platform Alliance (TCPA), "TCPA Design Philosophies and Concepts, Version 1.0", 2000, pp. 32 total.
Heinrich, J., "MIPS R4000 Microprocessor User's Manual", 1994, MIPS Technology, Inc., Mountain View, CA, pp. 67-79.
"M68040 User's Manual", 1993, Motorola, Inc., pp. 1-20.
Berg, C., "How Do I Create a Signed Applet?", Dr. Dobb's Journal M&T Publ., Redwood City, CA US, vol. 22, No. 8, Aug. 1997 pp. 109-111, 122.
Gong, L., et al., "Going Beyond the Sandbox: An Overview of the New Security Architecture in the Java Development Kit 1.2", Proceedings of the Usenix Symposium on the Internet Technologies and Systems, Monterey, CA Dec. 1997, pp. 103-112.
Goldberg, R., "Survey of Virtual Machine Research", IEEE Computer Magazine 7(6), 1974, pp. 34-45.
Gum, P.H., "System/370 Extended Architecture: Facilities for Virtual Machines", IBM J. Research Development, vol. 27, No. 6, Nov. 1983, pp. 530-544.
Brands, Stefan, "Restrictive Blinding of Secret-Key Certificates", Springer-Verlag XP002201306, Chapter 3, 1995, pp. 17 total.
Davida, George I. et al., "Defending Systems Against Viruses through Cryptographic Authentication", Proceedings of the Symposium on Security and Privacy, IEEE Comp. Soc. Press, ISBN 0-8186-1939-2, May 1989, pp. 312-318.
Kashiwagi, Kazuhiko et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Computer Society, US, ISBN 0-8186-7638-8, (1996), pp. 278-287.
Luke, Jahn et al., "Replacement Strategy for Aging Avionics Computers", IEEE AES Systems Magazine, XP002190614, Mar. 1999, pp. 7-11.
Saez, Sergio et al., "A Hardware Scheduler for Complex Real-Time Systems", Proceedings of IEEE International Symposium on Industrial Electronics, XP002190615, Jul. 1999, pp. 43-48.
Sherwood, Timothy et al., "Patchable Instruction ROM Architecture", Department of Computer Science and Engineering, University of California, San Diego, La Jolla, CA Nov. 2001, pp. 24-33.
Intel Corporation, "Intel 82802AB82802AC Firmware Hub (FWH)", Intel Product Datasheet, Document No. 290658-004, Nov. 2000, pp. 1-6, 17-28.
RSA Security, "Hardware Authenticators", www.rsasecurity.com/node.asp?id=1158, Copyright 2009 RSA Security, pp. 1-2.
RSA Security, "Software Authenticators", www.srasecurity.com/node.asp?id=1313, Copyright 2009 RSA Security, pp. 1-2.

Robin, John Scott et al., "Analysis of the Pentium's Ability to Support a Secure Virtual Machine Monitor", Proceedings of the 9th USENIX Security Symposium Aug. 14, 2000, XP002247347, Denver, CO. pp. 1-17.

Karger, Paul A. et al., A VMM Security Kernel for the VAX Architecture, Proceedings of the Symposium on Research in Security and Privacy, May 7, 1990, XP010020182, ISBN: 0-8186-2060-9, Boxborough, MA, pp. 2-19.

Chien, Andrew A. et al., "Safe and Protected Execution for the Morph/AMRM Reconfigurable Processor", 7th Annual IEEE Symposium, FCCM '99 Proceedings April 21, 1999, XP010359180, ISBN: 0-7695-0375-6, Los Alamitos, CA pp. 209-221.

Ateniese, G. et al., "A Practical and Provable Secure Coalition-Resistant Group Signature Scheme", CRYPTO2000, vol. 1880 of Lecture Notes in Computer Science ACM SIGARCH Computer Architecture News, 2000, pp. 16 total.

Hall, J. et al., "Virtualizing the VAX Architecture", Proceedings of the 18th Annual International Symposium on Computer Architecture, vol. 19, Issue No. 3, 1991, pp. 380-389.

Rosenberg, Jonathan, "Hardware Debugger Facilities", Wiley Computer Publishing, U.S., 1996, pp. 42-43, 95, 96 and 99.

* cited by examiner

TRUSTED PLATFORM MODULE FOR GENERATING SEALED DATA

BACKGROUND OF THE DISCLOSURE

Trust has become more and more important as the computing industry continues to grow. Mobile computing devices, such as notebook personal computers (PCs), personal data assistants (PDAs), and other devices are now common accessories used in day-to-day business and personal activities. With this growth, there is a need to make these platforms more trustworthy. Due to the ease of transport, mobile platforms are more and more susceptible to theft. In many cases, stolen data is regarded as being more valuable than the platform hardware. Accordingly, it has become imperative to protect user data and secrets in the mobile computing field.

The Trusted Computing Group (TCG) was formed to encourage industry participation in the development and adoption of an open specification for an improved computing platform. The TCG participants agreed that the specification for a trusted computing platform should focus on ensuring privacy and enhancing security. The TCG developed mechanisms which are intended to provide increased confidence and enable enhancements of existing services as well as the provision of new services. The "Trusted Platform Module" (TPM) is intended to "report" the integrity of a platform. This allows an external resource (e.g., a server on a network) to determine the trustworthiness of the platform but does not prevent access to the platform by the user.

The TPM can be described as a secure micro-controller with added cryptographic functionalities. The TPM includes various functions, storage locations, and a number of trust-related capabilities. The SEAL capability is used to ensure that data protected by a single TPM is only available on the same TPM. Currently, the TPM only releases the sealed data based on values contained in platform configuration registers (PCRs). The sealed data contains one or more expected PCR values and the TPM mechanism ensures the release of the data only when expected PCR values match the current PCR values in the TPM. However, the TPM has no way to further restrict the use of the sealed data.

DETAILED DESCRIPTION

A trusted platform module (TPM) can be associated with a platform, such as server, desktop, handheld device, and other computing devices. The TPM can be used to seal data and other information in a sealed blob. The TPM is configured to seal the data in a manner to restrict further use of the data. The TPM can operate to seal the data to restrict further use based on internal TPM mechanisms, such as counts, time, or session to thereby prevent replay attacks on the data. Accordingly, embodiments of a method and system for creating sealed data are disclosed herein. In one embodiment, a TPM operates to seal data and at least one monotonic counter parameter in a blob. In another embodiment, a TPM operates to seal data and a tick counter parameter in a blob. In yet another embodiment, a TPM operates to seal data and a session parameter in a blob. The data is only released if the associated parameter included in the blob corresponds to a current parameter. By associating one or more of these parameters with a sealed blob, the TPM can internally restrict the use the sealed data and thereby provide a secure sealed blob.

In the following description, numerous specific details are introduced to provide a thorough understanding of, and enabling description for, embodiments of operations using the TPM. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
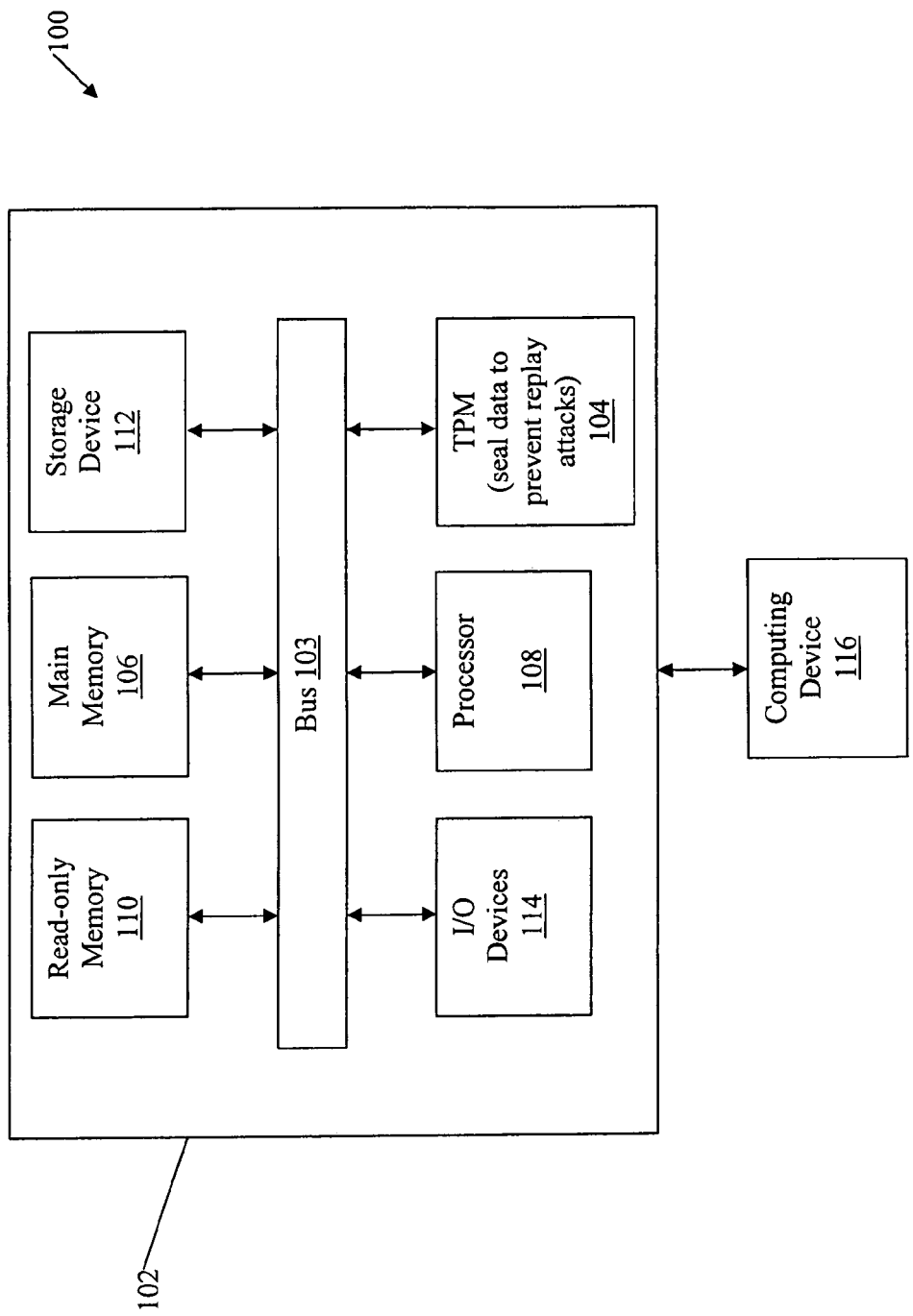
FIG. 1 is a block diagram of an operating environment including a TPM that seals data to prevent replay attacks.

FIG. 1 illustrates an operating environment 100 including a TPM 104 that seals data to prevent replay attacks, under embodiments described herein. A platform, computing device 102 for example, includes a bus 103 in communication with a trusted platform module (TPM) 104. As described further below, the TPM is used in various secure transactions, such as transactions in which the computing device 102 requires secure communication of data. The computing device 102 is one type of a "platform." Generally, a platform corresponds to an entity, such as a server, mobile computing device, personal computer, etc. operating to transfer and manipulate information. The platform 102 and TPM 104 are described below in detail as represented by platform 204 and TPM 200 (FIG. 2A), platform 304 and TPM 300 (FIG. 3A), platform 404 and TPM 400 (FIG. 4A). The computing device 102 typically includes random access memory (RAM) or other dynamic storage as a main memory 106 for storing information and instructions to be executed by a processor 108. It will be appreciated that the computing device 102 can include multiple processors and other devices.

The computing device 102 can include read-only memory (ROM) 110 and/or other static storage for storing static information and instructions for the processor 108. A storage device 112, such as a magnetic disk, optical disk and drive, flash memory or other nonvolatile memory, or other memory device, can be coupled to the bus 103 of the computing device 102 for storing information and instructions. A number of input/output (I/O) devices 114 can be coupled with the computing device 102 via bus 103. Exemplary (I/O) devices include, but are not limited to, display devices, communication devices, audio devices, and various manipulation devices for inputting and outputting information to a platform. The computing device 102 can be in communication with a network, system, or other computing devices, such as computing device 116.

Figure 2A:
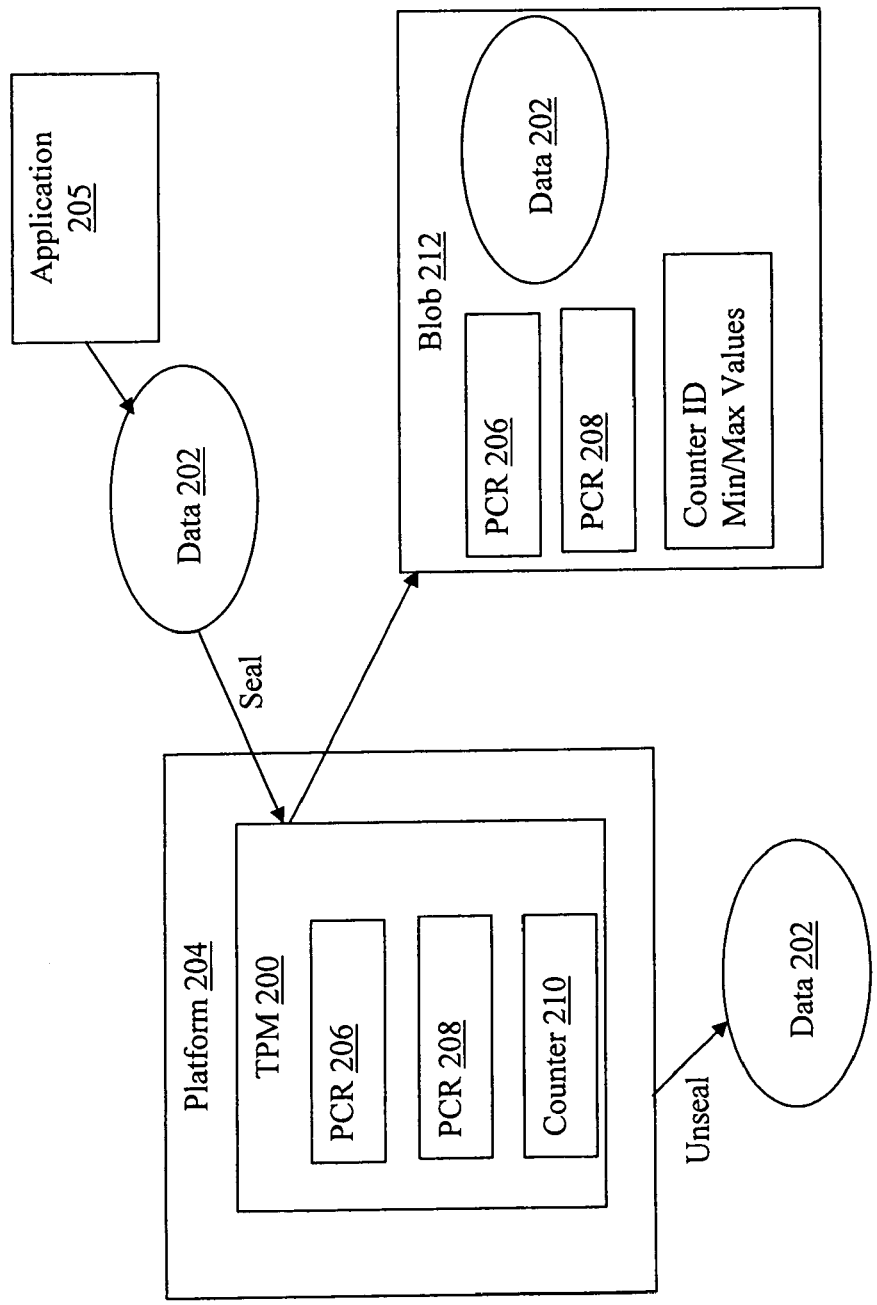
FIG. 2A is a functional block diagram of a TPM seal operation according to an embodiment.

FIG. 2A is a functional block diagram which illustrates using a TPM 200 to seal data 202 and other information, according to an embodiment. The TPM 200 operates to seal data 202 in a manner that prevents replay attacks on the data 202. According to this embodiment, the description is based on a single-use sealed blob, however, it will be appreciated that the embodiments described herein can be used to restrict the use of sealed data based on any pre-specified number of uses. As shown in FIG. 2A, the TPM 200 is associated with a platform 204. The platform can be associated with multiple applications, but only one application 205 is shown to simplify the discussion. The application 205 may be incorporated with the platform 204, or associated with another platform.

The TPM 200 is used to protect data and keys (secrets) using its encryption capabilities (an RSA encryption algorithm, for example). The TPM 200 has capability to store secrets internally and externally. External storage enables migration of protected data between systems and also allows back up of data in case of a device failure, such as a hard drive crash. The TPM 200 operates to provide secure storage "blobs" which include secure data for external storage. The TPM 200 operates to provide secure data blobs that contain arbitrary data and/or key blobs that contain a key that can be imported back into the TPM 200. These blobs can be stored securely on any media.

With continuing reference to FIG. 2A, the TPM 200 includes a number of platform configuration registers (PCRs). Two such registers, PCR 206 and PCR 208, are shown for simplification of the description. However, it will be appreciated that the TPM 200 can include any number of PCRs. PCR 206 and PCR 208 are registers which operate to hold information about the platform 204. For example, each PCR may hold a hash value representing one or more platform components such as the BIOS, the operating system, the keyboard driver, the video driver, etc.

According to this embodiment, the TPM 200 includes a number of monotonic counters (monotonic counter 210 shown in FIG. 2A) which can be used in conjunction with PCR 206 and PCR 208 during a seal process to seal data and other information. The monotonic counter 210 provides a mechanism via at least one counter parameter for the TPM 200 to internally enforce single use of data. That is, after using the data, the TPM 200 can operate to enforce the invalidation of the data based in part on parameters of the monotonic counter 210. The monotonic counter 210 can be used by protocols to reduce replay attack threats by including parameters associated with the monotonic counter 210 in a sealed blob, as described below. The monotonic counter 210 can be associated with a minimum and maximum count range, to thereby allow minimal use (once) or multiple uses (e.g., 100) for example.

The monotonic counter 210 can be implemented in the TPM 200 as software, hardware, or a combination of both. For example, hardware implementations of the monotonic counter 210 can be based on flash memory technology, counter logic, etc. The state of the monotonic counter 210 is non-volatile and cannot be manipulated by entities outside the TPM 200. The monotonic counter 210 is an incrementing algorithm and operates to not repeat values. Moreover, the monotonic counter 210 of alternative embodiments is not limited to incrementing in units of "1".

Figure 2B:
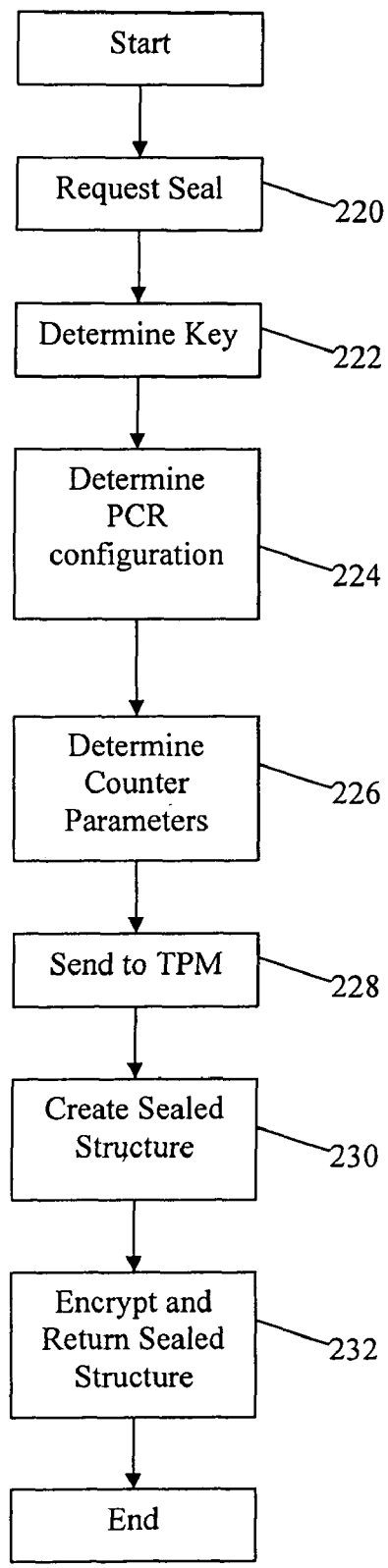
FIG. 2B is a flow diagram illustrating a seal operation associated with FIG. 2A.

FIG. 2B is a flow diagram illustrating a seal operation according to this embodiment. At 220, a caller, such as application 205, requests a seal operation by the TPM 200. At 222, the caller determines a parent key of the data 202. At 224, the caller determines the PCR configuration associated with the particular seal. At 226, the caller determines which counter to use (counter ID), such as monotonic counter 210, a minimum counter value, and a maximum counter value associated with the particular seal. The TPM 200 includes a number of monotonic counters with associated pointers that allow external callers to indicate which counters are in use. The inclusion of the counter pointer in the sealed blob 212 ties the blob 212 to an associated monotonic counter.

At 228, the caller sends the data 202, PCR configuration, counter ID, minimum counter value, and maximum counter value to the TPM 200. At 230, after checking if the counter ID is valid, the TPM 200 creates a sealed structure (e.g., the blob 212). The TPM_Seal operator executes to perform RSA encryption of the data 202 and other information, which can require a loaded encryption key and an authorization secret for that key. At 232, the TPM 200 encrypts the sealed blob 212 and returns the blob 212 to the caller or saves the blob 212 to memory. The sealed blob 212 includes the data 202, PCR configuration, counter ID, minimum counter value, and maximum counter value (see FIG. 2A).

Figure 2C:
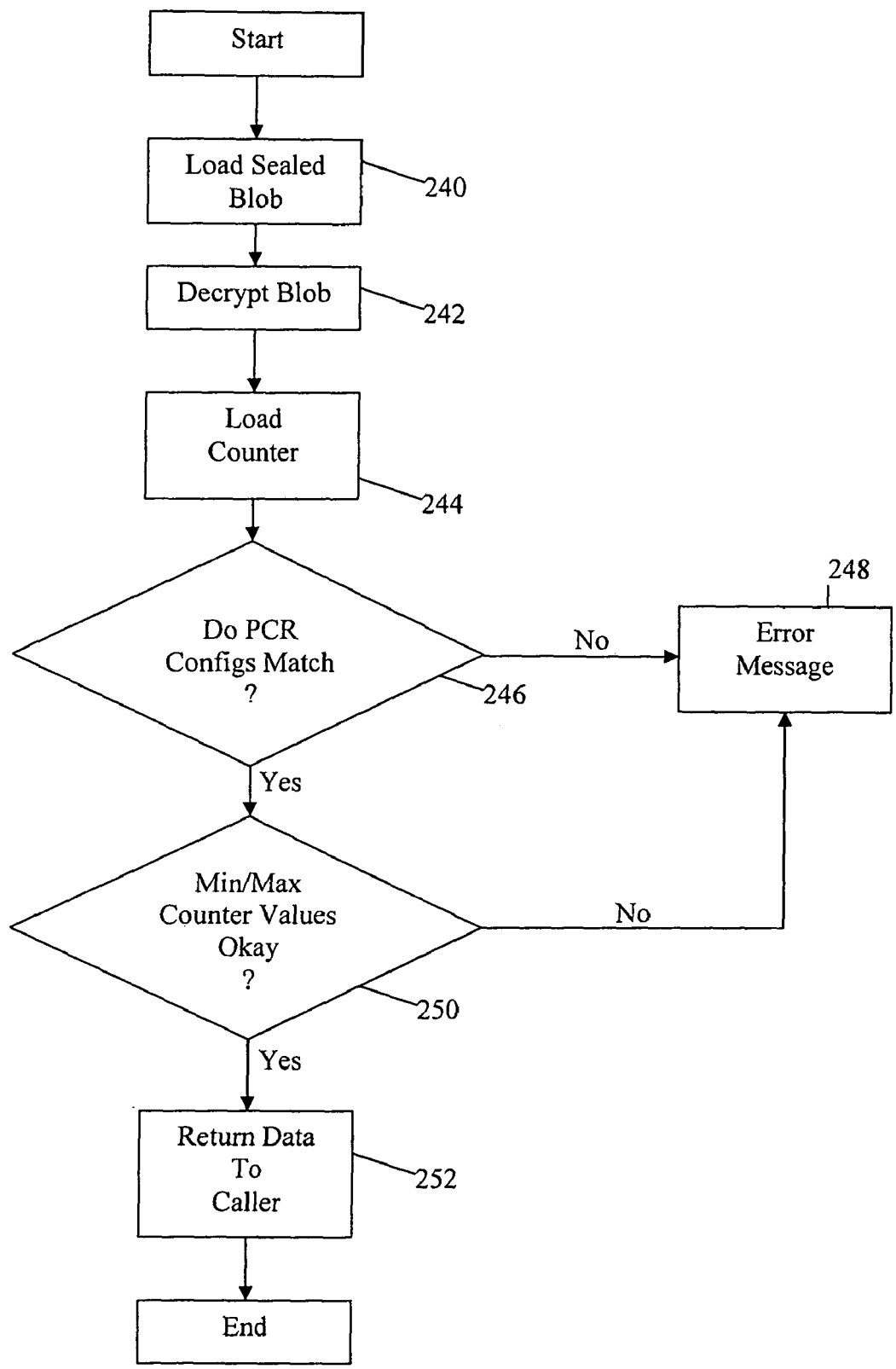
FIG. 2C is a flow diagram illustrating an unseal operation associated with FIGS. 2A-2B.

FIG. 2C is a flow diagram illustrating an unseal operation according to this embodiment. The sealed blob 212 ensures that data 202 sealed by the TPM 200 is only available on TPM 200. Moreover, the TPM 200 only releases the data when a specified configuration is present. As described above, according to this embodiment, the sealed blob 212 includes the data 202, PCR configuration, counter ID, minimum counter value, and maximum counter value. At 240, the sealed blob 212 is loaded in the TPM 200. At 242, the TPM 200 decrypts the blob 212 since it has access to the parent key and can perform the decryption using the private portion of the parent key.

The TPM_Unseal operator executes to decrypt the blob 212 using RSA decryption. Internally, TPM_Unseal accepts the data blob 212 generated by the TPM_Seal operation. TPM_Unseal decrypts the structure internally, checks the integrity of the resulting data, and checks the PCR configuration and counter parameters named during TPM_Seal. Additionally, the caller may be required to supply appropriate authorization data for the blob 212 and the key that was used to seal the data 202.

At 244, the TPM 200 loads the indicated counter based on the counter ID stored in the blob 212. At 246, the TPM 200 determines whether the current PCR configuration matches the PCR configuration in the decrypted blob 212. If the PCR configurations do not match, at 248, an error or similar message is returned to the caller. If the PCR configurations match, at 250, the current minimum and maximum counter values are compared to the minimum and maximum counter values stored in the decrypted blob 212. If the comparison is not successful, at 248, an error or similar message is returned to the caller. If the comparison is successful, at 252, the data 212 is returned to the caller and the TPM 200 increases the counter. The increase automatically ensures the restricted use of the data of the sealed blob 212. Alternatively, the counter can be incremented by external request. The PCR configuration comparison can be eliminated according to an alternative embodiment.

Figure 3A:
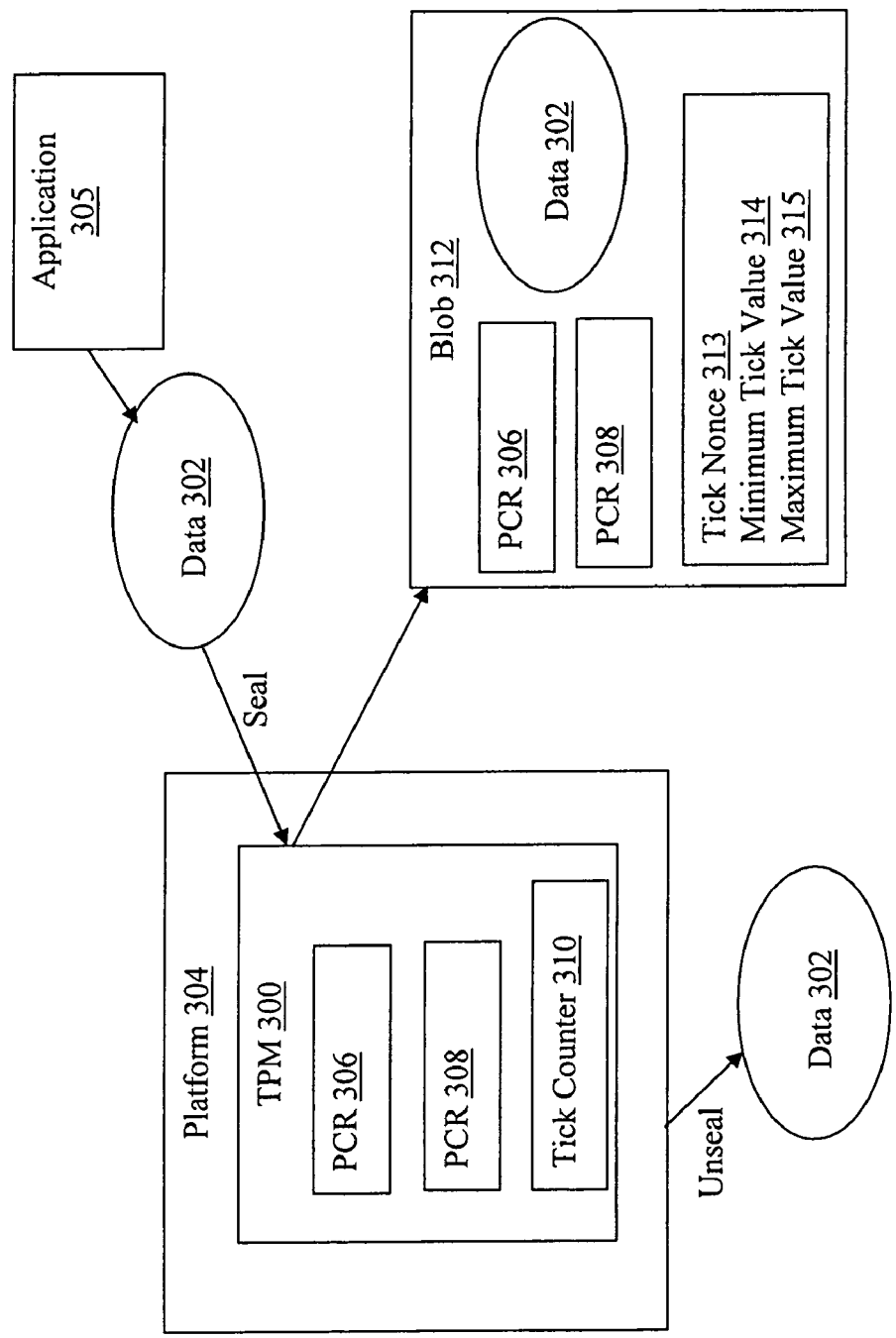
FIG. 3A is a functional block diagram of a TPM seal operation according to another embodiment.
Figure 4A:
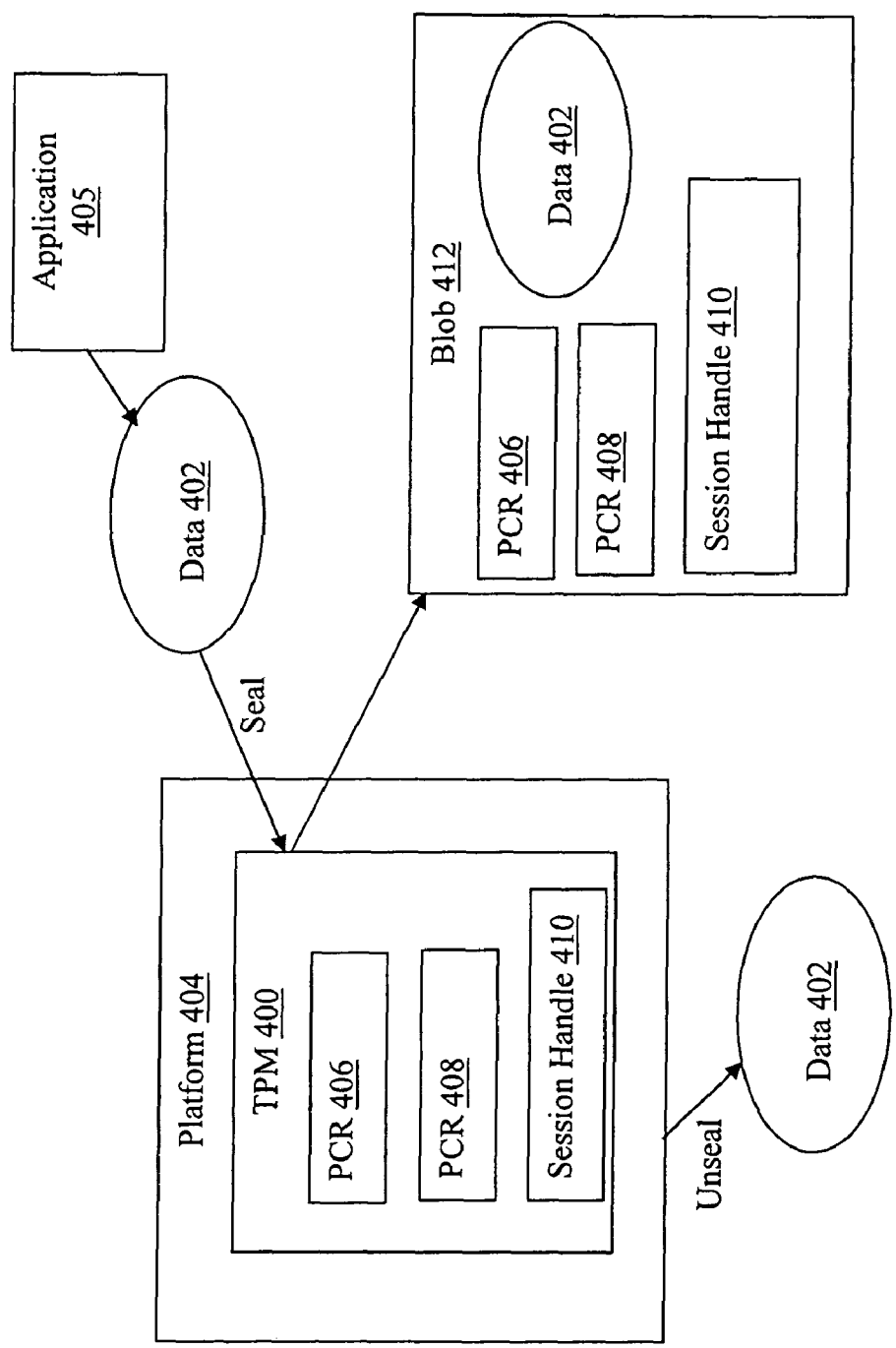
FIG. 4A is a functional block diagram of a TPM seal operation according to yet another embodiment.

FIG. 3A is a functional block diagram which illustrates using a TPM 300 to seal data 302 and other information, according to another embodiment. As an example, the description below is based on a single-use sealed blob based on usage during an amount or period of time, however, it will be appreciated that the embodiments described herein can be used to restrict the use of sealed data based on a defined number of uses and/or associated times. The TPM 300 operates to seal data 302 in a manner that prevents replay attacks on the data 302. The TPM 300 is associated with a platform 304. The platform can be associated with multiple applications, but only one application 305 is shown to simplify the discussion. The application 305 may be incorporated with the platform 304, or associated with another platform. The TPM 300 is used to protect data and keys (secrets) using its encryption capabilities. The TPM 300 has capability to store secrets internally and externally. External storage enables migration of protected data between systems and also allows back up of data in case of a device failure. The TPM 300 can operate to provide secure storage "blobs" which include secure data for external storage. The TPM 300 can operate to provide secure data blobs that contain arbitrary data and/or key blobs that contain a key that can be imported back into the TPM 300. These blobs can be stored securely on any media.

The TPM 300 includes a number of platform configuration registers (PCRs). Two such registers, PCR 306 and PCR 308, are shown for simplification of the description. However, it will be appreciated that the TPM 300 can include any number of PCRs. PCR 306 and PCR 308 are registers which operate to hold information about the platform 304. For example, each PCR may hold a hash value representing one or more platform components such as the BIOS, the operating system, the keyboard driver, the video driver, etc.

In accordance with this embodiment, the TPM 300 includes a tick counter 310 which can be used in conjunction with PCR 306 and PCR 308 during a seal process to seal data and other information. However, it will be appreciated that multiple applications can use the tick counter 310. The tick counter 310 provides a mechanism via at least one counter parameter for the TPM 300 to internally enforce the use of data for a predetermined amount of time. That is, after using the data for the predetermined time period (one second or 10 days for example), the TPM 300 can operate to enforce the invalidation of the data based in part on parameters associated with the tick counter 310. The tick counter 310 can be used by protocols to reduce replay attack threats by including parameters associated with the tick counter 310 in a sealed blob, as described below. In an alternative embodiment, the TPM 300 can include multiple tick counters.

The tick counter 310 can be implemented in the TPM 300 as software, hardware, or a combination of both. This tick counter 310 monitors and holds the current number of time ticks in the TPM 300. For example, the value is the number of time ticks from the start of the current session or since power was applied to the TPM 300. The <tickRate> element of the TPM_CURRENT_TICKS structure provides a relationship between ticks and seconds, allowing the TPM 300 to map between actual time and tick counts. The <tickType> element of TPM_CURRENT_TICKS structure provides definitions for events associated with the start of a clock session. The value of TPM_CURRENT_TICKS can be reset to zero when a new clock session starts and increments under control of the TPM 300. The state of the tick counter 310 is non-volatile and cannot be manipulated by entities outside the TPM 300.

Figure 3B:
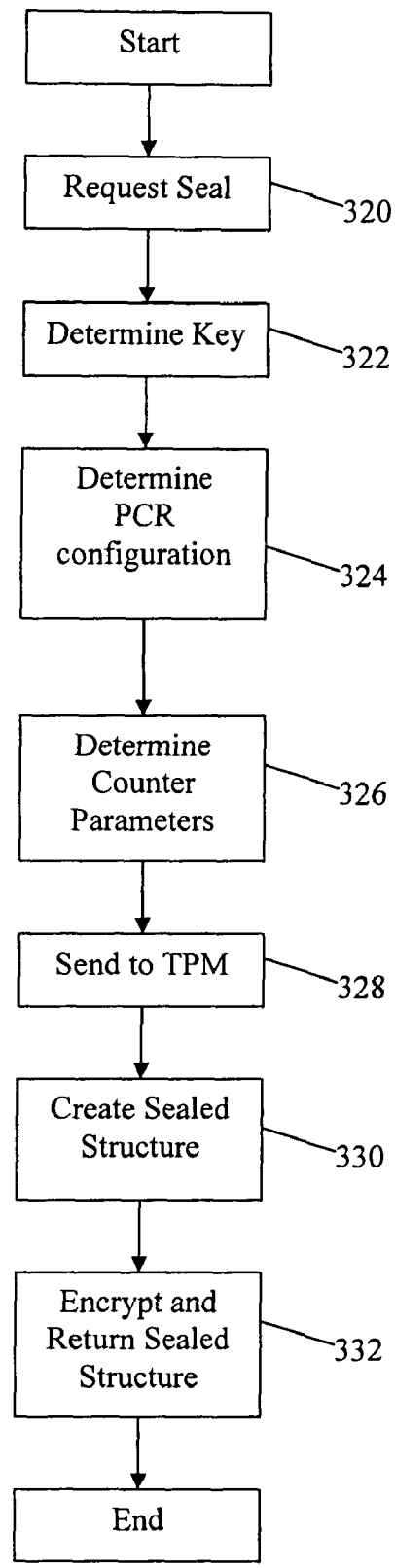
FIG. 3B is a flow diagram illustrating the seal operation of FIG. 3A.

FIG. 3B is a flow diagram illustrating a seal operation according to this embodiment. At 320, a caller, such as application 305, requests a seal operation by the TPM 300. At 322, the caller determines a parent key of the data 302. At 324, the caller determines the PCR configuration associated with the particular seal. At 326, the caller determines a usage duration based on minimum and maximum tick values 314 and 315 (a tick era). The minimum and maximum tick values 314 and 315 are based on a tick nonce 313 associated with the particular seal. The inclusion of the tick counter parameters in the sealed blob 312 ties the data 302 in blob 312 to the usage duration.

At 328, the caller sends the data 302, PCR configuration, tick nonce 313, minimum tick value 314, and maximum tick value 315 to the TPM 300. At 330, after checking if the tick nonce 313 is valid, the TPM 300 creates a sealed structure (the blob 312). The TPM_Seal operator executes to perform RSA encryption of the data 302 and other information, which can require a loaded encryption key and an authorization secret for that key. At 332, the TPM 300 encrypts the sealed blob 312 and returns the blob 312 to the caller or saves the blob 312 to memory. The sealed blob 312 includes the data 302, PCR configuration, tick nonce 313, minimum tick value 314, and maximum tick value 315 (see FIG. 3A).

Figure 3C:
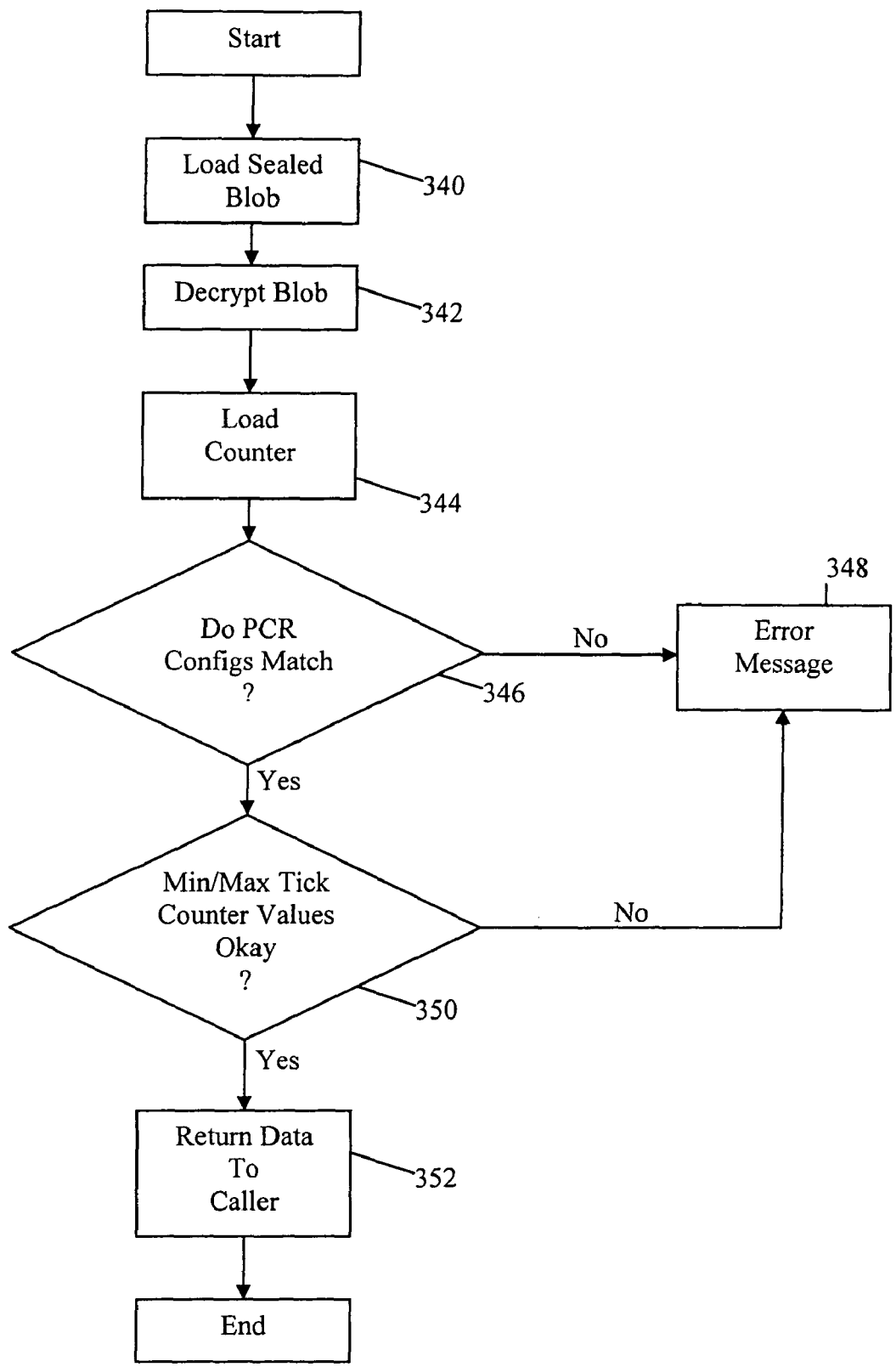
FIG. 3C is a flow diagram illustrating an unseal operation associated with FIGS. 3A-3B.

FIG. 3C is a flow diagram illustrating an unseal operation according to this embodiment. The sealed blob 312 ensures that data 302 sealed by the TPM 300 is only available on TPM 300. Moreover, the TPM 300 only releases the data 302 when a specified configuration is present, ensuring that the data 302 is used for a set duration. As described above, according to this embodiment, the sealed blob 312 includes the data 302, PCR configuration, tick nonce 313, minimum tick value 314, and maximum tick value 315. At 340, the sealed blob 312 is loaded in the TPM 300. At 342, the TPM 300 decrypts the blob 312. The TPM_Unseal operator executes to decrypt the blob 312 using RSA decryption.

At 344, the TPM 300 loads the indicated counter based on the tick nonce 313 stored in the blob 312. At 346, the TPM 300 determines whether the current PCR configuration matches the PCR configuration in the decrypted blob 312. If the PCR configurations do not match, at 348, an error or similar message is returned to the caller. If the PCR configurations match, at 350, the current minimum and maximum tick values are compared to the minimum and maximum tick values 314 and 315 stored in the decrypted blob 312. If the comparison is not successful, at 348, an error or similar message is returned to the caller. If the comparison is successful, at 352, the data 312 is returned to the caller. The tick count continues to add up as the TPM 300 executes. In an alternative embodiment, the PCR configuration comparison can be eliminated when unsealing the blob 312.

FIG. 4A is a functional block diagram which illustrates using a TPM 400 to seal data 402 and other information, according to yet another embodiment. According to this embodiment, the description is based on a single-use sealed blob, however, it will be appreciated that the embodiments described herein can be used to restrict the use of sealed data based on a defined number of uses and/or period of time. The TPM 400 operates to seal data to create single use signed blobs for use during a specific time, such as during a single transport session. While the particular transport session is active, the data is unsealable. Once the transport session expires, the data is no longer available.

As shown in FIG. 4A, the TPM 400 is associated with a platform 404 which is operating in a transport session. The platform can be associated with multiple applications, but only one application 405 is shown to simplify the discussion. The application 405 may be incorporated with the platform 404, or associated with another platform. The TPM 400 is used to protect data and keys (secrets) using its encryption capabilities. The TPM 400 has capability to store secrets internally and externally. External storage enables migration of protected data between systems and also allows back up of data in case of a device failure. The TPM 400 can operate to provide secure storage "blobs" which include secure data for external storage. The TPM 400 can operate to provide secure data blobs that contain arbitrary data and/or key blobs that contain a key that can be imported back into the TPM 400. These blobs can be stored securely on any media.

The TPM 400 includes a number of platform configuration registers (PCRs). Two such registers, PCR 406 and PCR 408, are shown for simplification of the description. However, it will be appreciated that the TPM 400 can include any number of PCRs. PCR 406 and PCR 408 are registers which operate to hold information about the platform 404. For example, each PCR may hold a hash value representing one or more platform components such as the BIOS, the operating system, the keyboard driver, the video driver, etc.

In accordance with this embodiment, the TPM 400 includes a session handle 410 which is established during a particular transport session. That is, a unique session handle 410 is associated with a particular transport session. The session handle 410 can be used in conjunction with PCR 406 and PCR 408 during a seal process to seal data and other information. The session handle 410 is at least one session parameter that provides a mechanism for the TPM 400 to internally enforce single session use of data. After using the data, the TPM 400 can operate to enforce the invalidation of the data. The. session handle 410 can be used by protocols to reduce replay attack threats by including parameters associated with the session handle 410 in a sealed blob.

Figure 4B:
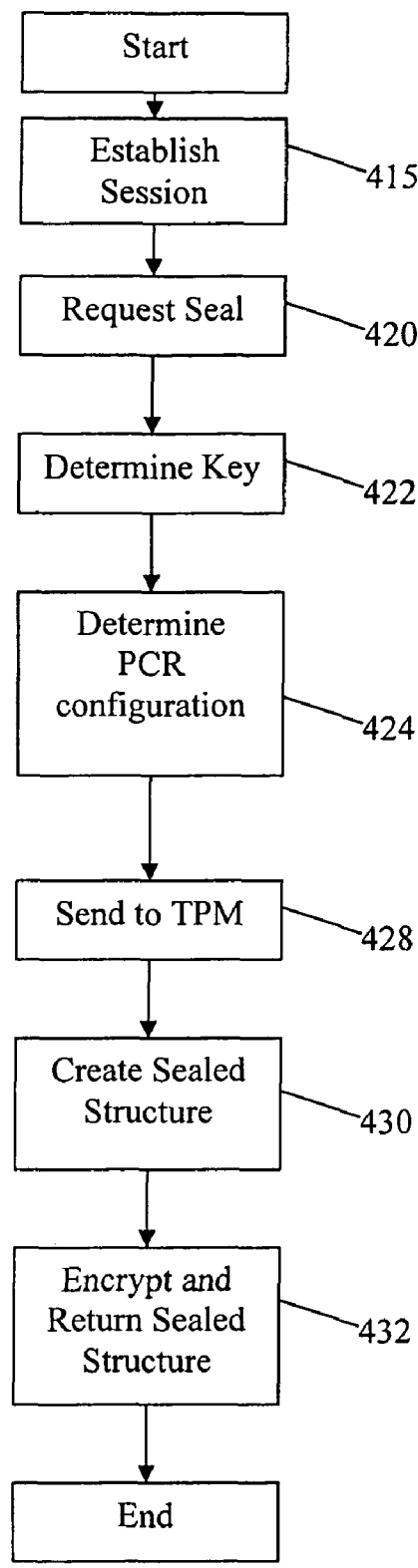
FIG. 4B is a flow diagram illustrating the seal operation of FIG. 4A.

FIG. 4B is a flow diagram illustrating a seal operation according to this embodiment. At 415, a caller establishes a session with the TPM 400 and assigns a unique session handle associated with the particular session. At 420, the caller requests a seal operation by the TPM 400. At 422, the caller determines a parent key of the data 402. At 424, the caller determines the PCR configuration associated with the particular seal. The inclusion of the session handle 410 in the sealed blob 412 ties the blob 412 to the session, allowing the use of data 402 only during the particular session.

At 428, the caller sends the data 402, PCR configuration, and session handle 410 to the TPM 400. At 430, after checking if the session handle 410 is valid, the TPM 400 creates a sealed structure (the blob 412). The TPM_Seal operator executes to perform RSA encryption of the data 402 and other information, which can require a loaded encryption key and an authorization secret for that key. At 432, the TPM 400 encrypts the sealed blob 412 and returns the blob 412 to the caller or saves the blob 412 to memory. The sealed blob 412 includes the data 402, PCR configuration, and session handle 410 (see FIG. 4A).

Figure 4C:
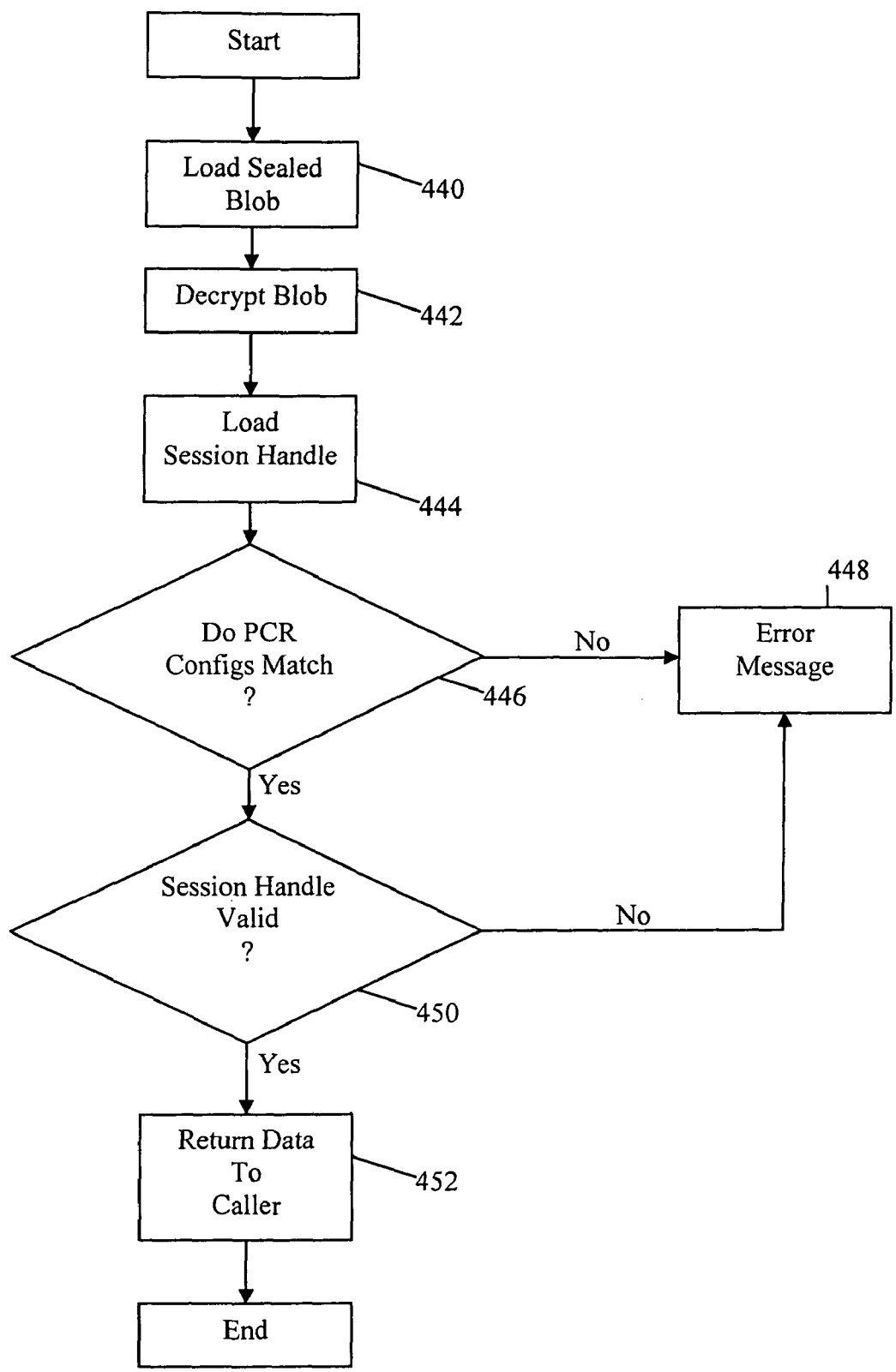
FIG. 4C is a flow diagram illustrating an unseal operation associated with FIGS. 4A-4B.

FIG. 4C is a flow diagram illustrating an unseal operation according to this embodiment. The sealed blob 412 ensures that data 402 sealed by the TPM 400 is only available on TPM 400 during a particular transport session. Moreover, the TPM 400 only releases the data when a specified configuration is present. As described above, according to this embodiment, the sealed blob 412 includes the data 402, PCR configuration, and session handle 410. At 440, the sealed blob 412 is loaded in the TPM 400. At 442, the TPM 400 decrypts the blob 412. The TPM_Unseal operator executes to decrypt the blob 412 using RSA decryption.

At 444, the TPM 400 loads the session handle 410. At 446, the TPM 400 determines whether the current PCR configuration matches the PCR configuration in the decrypted blob 412. If the PCR configurations do not match, at 448, an error or similar message is returned to the caller. If the PCR configurations match, at 450, the session handle 410 stored in the TPM 400 is compared to the session handle 410 stored in the decrypted blob 412. If the comparison is not successful, at 448, an error or similar message is returned to the caller. If the comparison is successful, at 452, the data 412 is returned to the caller. Once the session ends, the session handle is discarded and a new session handle is determined upon establishing a subsequent session, ensuring that the data of the sealed blob 412 is only used during a particular session. Alternatively, the PCR configuration comparison can be eliminated and the session handle 410 can be used for determining whether to return the data to the caller.

It will be appreciated that the embodiments described herein can also be used when a platform requires a sleep, hibernation, or other state. A use model is described wherein during a state, such as a sleep state, a TPM can seal data and thereby protect the associated state. The seal process described herein ensures that the state is only available for a single use, preventing replay attacks on the data. Moreover, the various embodiments described herein can be combined in various configurations. For example, data could be sealed and unsealed only if the PCR configuration(s), count(s), tick (s), and/or session are valid.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Embodiments may also be implemented as microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventor contemplates the various aspects in any number of claim forms. For example, while only one aspect is recited as embodied in machine-readable medium, other aspects may likewise be embodied in machine-readable medium. Accordingly, the inventor reserves the right to add additional claims after filing the application to pursue such additional claim forms for other aspects as well.

What is claimed is:

1. A method for creating single use data, the method comprising:
    determining, with a trusted platform module of a computing device, a key for sealing the data;
    receiving a selection of a counter, from a plurality of currently available counters of the trusted platform module, to provide a counter parameter for sealing the data;
    associating a counter parameter obtained from the selected counter with the data; and
    the trusted platform module using the key to seal the data, a pointer to the selected counter, and the counter parameter into a secure storage blob to enable the trusted platform module to enforce use limitations on the data utilizing the selected counter and the counter parameter.

2. The method of claim 1, further comprising associating at least one platform configuration register (PCR) with the data.

3. The method of claim 1, wherein the counter parameter includes monotonic counter parameters.

4. The method of claim 3, wherein the monotonic counter parameters comprise a counter ID, a minimum counter value, and a maximum counter value.

5. The method of claim 4, further comprising:
    unsealing the data, counter ID, minimum counter value, and maximum counter value,
    analyzing the unsealed counter ID, minimum counter value, and maximum counter value,
    releasing the data if the counter ID, minimum counter value, and maximum counter value correspond to current values, and
    automatically incrementing a counter parameter for a monotonic counter identified by the counter ID in response to the releasing.

6. The method of claim 2, wherein the counter parameter includes tick counter parameters.

7. The method of claim 6, wherein the tick counter parameters comprise a tick nonce, a minimum tick value, and a maximum tick value.

8. The method of claim 7, further comprising:
    unsealing the data, tick nonce, minimum tick value, and maximum tick value,
    analyzing the unsealed tick nonce, minimum tick value, and maximum tick value, and
    releasing the data if the tick nonce, minimum tick value, and maximum tick value correspond to current values.

9. A computer-readable storage medium having stored thereon instructions, which when executed in a system operate to create single use data by:
    determining a key for sealing the data;
    receiving a selection of a counter, from a plurality of currently available counters of a trusted platform module, to provide a counter parameter for sealing the data; and
    associating a counter parameter obtained from the selected counter with the data; and
    the trusted platform module using the key to seal the data, a pointer to the selected counter, and the counter parameter into a secure storage blob to enable the trusted platform module to enforce use limitations on the data utilizing the selected counter and the counter parameter.

10. The medium of claim 9, wherein the counter parameter comprises monotonic counter parameters.

11. The medium of claim 10, wherein the monotonic counter parameters comprise a counter ID, a minimum counter value, and a maximum counter value.

12. The medium of claim 11, wherein the operation further comprises:
    unsealing the data, counter ID, minimum counter value, and maximum counter value, and
    releasing the data if the counter ID, minimum counter value, and maximum counter value correspond to current values.

13. The medium of claim 9, wherein the counter parameter further comprises tick counter parameters.

14. The medium of claim 13, wherein the tick counter parameters further comprise a tick nonce, a minimum tick value, and a maximum tick value.

15. The medium of the 14, wherein the operation further comprises:
    unsealing the data, tick nonce, minimum tick value, and maximum tick value, and
    releasing the data if the tick nonce, minimum tick value, and maximum tick value correspond to current values.

16. A system configured to create single use data, the system comprising:
    a trusted platform module (TPM) configured to,
        determine a key for sealing the data;
        receive a selection of a counter, from a plurality of currently available counters of the TPM, to provide a counter parameter for sealing the data;
        associate a counter parameter obtained from the selected counter with the data; and
        use the key to seal the data, a pointer to the selected counter, and the counter parameter into a secure storage blob to enable the TPM to enforce use limitations on the data utilizing the selected counter and the counter parameter.

17. The system of claim 16, wherein the counter parameter includes monotonic counter parameters.

18. The system of claim 17, wherein the monotonic counter parameters include a counter ID, a minimum counter value, and a maximum counter value.

19. The system of claim 18, wherein the TPM is further configured to:
   unseal the data, counter ID, minimum counter value, and maximum counter value, and
   release the data if the counter ID, minimum counter value, and maximum counter value correspond to current values.

20. The system of claim 16, wherein the counter parameter includes tick counter parameters.

21. The system of claim 20, wherein the tick counter parameters include a tick nonce, a minimum tick value, and a maximum tick value.

22. The system of claim 21, wherein the TPM is further configured to:
   unseal the data, tick nonce, minimum tick value, and maximum tick value, release the data if the tick nonce, minimum tick value, and maximum tick value correspond to current values.

23. A method of generating sealed data, the method comprising
   determining, with a trusted platform module of a computing device, a key for sealing the data;
   receiving at least one of a selection of a counter, from a plurality of currently available counters of the trusted platform module, to provide a parameter for sealing the data, or a selection of a session handle;
   associating a parameter with the data, wherein the parameter is selected from a group consisting of a counter parameter and a session parameter; and
   the trusted platform module using the key to seal the data and the parameter into a secure storage blob to enable the trusted platform module to enforce use limitations on the data utilizing the selected at least one of the counter or the session handle.

24. The method of claim 23, wherein the parameter comprises a session handle.

25. The method of claim 23, wherein the parameter comprises a monotonic counter parameter and a pointer to a selected monotonic counter.

26. The method of claim 23, wherein the parameter comprises a tick counter parameter and a pointer to a selected tick counter parameter.

* * * * *